United States Patent
Zhang et al.

(10) Patent No.: US 7,224,850 B2
(45) Date of Patent: May 29, 2007

(54) MODIFICATION OF RED-EYE-EFFECT IN DIGITAL IMAGE

(75) Inventors: Lei Zhang, Beijing (CN); Yanfeng Sun, Beijing (CN); Mingjing Li, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 828 days.

(21) Appl. No.: 10/436,710

(22) Filed: May 13, 2003

(65) Prior Publication Data

US 2004/0228542 A1 Nov. 18, 2004

(51) Int. Cl.
G06K 9/40 (2006.01)

(52) U.S. Cl. .................................. 382/275; 382/167

(58) Field of Classification Search ................ 382/275, 382/167, 117; 348/207; 358/222
See application file for complete search history.

(56) References Cited

U.S. PATENT DOCUMENTS

| | | | |
|---|---|---|---|
| 6,009,209 A | 12/1999 | Acker et al. | |
| 6,252,976 B1* | 6/2001 | Schildkraut et al. | 382/117 |
| 6,278,491 B1* | 8/2001 | Wang et al. | 348/370 |
| 6,292,574 B1* | 9/2001 | Schildkraut et al. | 382/117 |
| 6,873,743 B2* | 3/2005 | Steinberg | 382/275 |
| 2003/0053663 A1* | 3/2003 | Chen et al. | 382/117 |
| 2003/0202105 A1* | 10/2003 | Gaubatz et al. | 348/207.99 |
| 2004/0041924 A1* | 3/2004 | White et al. | 348/329 |

OTHER PUBLICATIONS

Mathew et al ; "Automatic Red-eye Detection and Correction";Image Processing. 2002. Proceedings. 2002 International Conference on Publication Date: 2002; vol. 1, On pp. 1-804-1-807 vol. 1□□.*

Apple website at http://www.apple.com/iphoto, "iPhoto 2—Picture your digital lifestyle," printed Mar. 4, 2003, 3 pages.

Apple website at http://www.apple.com/iphoto/edit.html, "Fine tune your photos," printed Mar. 4, 2003, 2 pages.

MSN website at http://phtos.msn.com/editorial/editorialstart.aspx?article=CDProductHome&section=CD_P . . . , "MSN Photos—More Useful Everyday—Microsoft Picture It! CD Products," printed Mar. 4, 2003, 2 pages.

MSN website at http://phtos.msn.com/editorial/EditorialStart.aspx?article=CDProductSubHome_Product_. . . . "MSN Photos—More Useful Everyday—Microsoft Picture It! CD Products Product Information and Picture It! Photo" printed Mar. 4, 2003, 4 pages.

Viola, Paul et al., "Robust Real-time Object Detection," Compaq Computer Corporation—Cambridge Research Laboratory, Technical Report Series, CRL 2001/01, Feb. 2001, title pages plus pp. 1-24.

U.S. Appl. No. 09/580,395, filed May 26, 2000, inventors Hong-Jiang Zhang et al., entitled "Pose-Adaptive Face Detection System and Process,".

U.S. Appl. No. 10/091,100, filed Mar. 4, 2002, inventors Hong-Jiang Zhang et al., entitled "A System and Method for Multi-View Face Detection,".

* cited by examiner

Primary Examiner—Joseph Mancuso
Assistant Examiner—Andrae Allison
(74) Attorney, Agent, or Firm—Lee & Hayes, PLLC (57) ABSTRACT

In one aspect, the present disclosure describes a process for automatic artifact compensation in a digital representation of an image. The process includes detecting, by a processor, regions corresponding to facial images within the digital representation; locating, by the processor, red-eye regions within the detected regions; and automatically modifying, by the processor, the located red-eye regions to provide a modified image.

17 Claims, 4 Drawing Sheets

MODIFICATION OF RED-EYE-EFFECT IN DIGITAL IMAGE

TECHNICAL FIELD

This disclosure relates to modification of "red-eye" artifacts resulting from retinal light reflection in photographic images of faces.

BACKGROUND

Photography has evolved tremendously over the last century, but has always incurred needs for manipulation of the captured images. In some cases, the manipulation seeks to improve some quality of the image relative to what a human subject might perceive. In other cases, the manipulation seeks to ameliorate artifacts of various types that cause the captured image to deviate from images corresponding to those a human subject might perceive.

The dynamic range of photographic media, including photodetectors employed in digital photography, is limited in comparison to the dynamic range of natural vision processes. As a result, there may be need to enhance illumination when taking a photograph. One convenient and highly portable approach suitable for close-range photography is to synchronize a brief but bright burst of light with the image capture process. In many cases, the illumination source is a flash bulb that is immediately adjacent the camera lens.

However, when the photograph includes faces, substantial reflection from the subject's retinae can occur depending on the relative position of the illumination source, the lens and the photographic subjects. This is exacerbated by dilation of the subject's pupils in response to the ambient illumination conditions that also made the added illumination desirable in order to be able to take the picture. In human subjects, such retinal reflections often result in unnatural reddening of the pupil region of the subject's eyes or a halo of red in that vicinity; in other types of animals, other colors may result (e.g., green in feline eyes, resulting from a reflective structure behind the retina known as a tapetum; other possibilities depend on the structure etc. of the subject's eyes).

Various types of editing have been employed in the past to address these distortions. Darkroom techniques historically have been employed for photographs using emulsion and other photochemical image recording technologies. Digitization of such images and direct digital image capture led to techniques requiring powerful processors and sophisticated software requiring extensive training and experience of human operators to achieve desired image manipulation goals.

However, the advent of digital photography, coupled with increasingly powerful microprocessors, permit editing of digital images in a personal computer. One exemplary product for such manipulation is known as "iPhoto", available from Apple, 1 Infinite Loop, Cupertino, Calif. 95014, tel. (408) 996-1010. Other exemplary products are known as "Picture It" and "PhotoDraw", developed by Microsoft Corporation, Redmond, Wash. These products require user input in order to be able to identify target regions within the image that include red-eye artifacts.

Another technique for red-eye amelioration is described in U.S. Pat. No. 6,009,209, entitled "Automated Removal Of Red Eye Effect From A Digital Image", issued to Acker et al., assigned to the assignee of this disclosure and hereby incorporated herein by reference. This patent describes an apparatus and method for automatically editing a digital color image by parsing the discoloration into regions and re-coloring the area of discoloration based on attributes of the discoloration. This technique also relies on user input to identify and correct red-eye artifacts in digital images.

Much research has been devoted to rendering digital photography user-friendly and to enable those having relatively little training or sophistication to provide high quality images. However, automatic compensation of image distortion due to the red-eye artifact continues to be desirable, particularly for photographic instruments intended to foster broad market acceptance across a user base reflecting different degrees of user sophistication.

SUMMARY

Apparatus and processes for automated artifact compensation such as red-eye correction in digital images are described. In one aspect, the disclosure describes a process for artifact compensation in a digital representation of an image. The process includes detecting, by a processor, regions corresponding to facial images within the digital representation; locating, by the processor, red-eye regions within the detected regions; and automatically modifying, by the processor, the located red-eye regions to provide a modified image.

DETAILED DESCRIPTION

Figure 1:
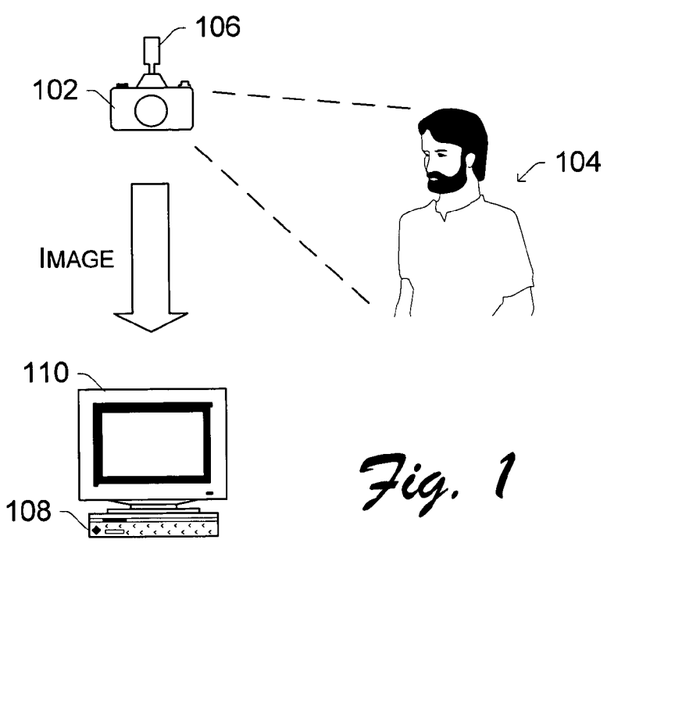
FIG. 1 illustrates an exemplary environment suitable for digital photography.

FIG. 1 illustrates an exemplary environment suitable for digital photography. A camera 102 is used to take a picture(s) of a subject 104 using a flash 106 on camera 102 that potentially causes red-eye in images captured of subject 104. These images captured by camera 102 (commonly referred to as a picture being taken) are analyzed for red-eye and the areas with red-eye are automatically detected and corrected as discussed in more detail below. The red-eye detection can be performed in the camera 102, or alternatively the captured images may be transferred to a computing device 108 that detects red-eye. Device 108 may be any of a wide variety of devices, such as a desktop or portable computer, copying or printing devices (e.g., a photograph enlargement device including a scanner and printer), etc. Device 108 may include a display 110.

Camera 102 may be any type of image capture device that captures and stores (or communicates) images, such as a film camera, a digital camera, a video camera, a camcorder, etc. Camera 102 may capture images in any of a variety of conventional manners, such as exposing film on which the image is captured, exposing one or more charge coupled devices (CCDs) or CMOS imaging ICs and storing a captured still image in memory (e.g., a removable Flash memory, hard disk (or other magnetic or optical storage medium), or motion video tape), exposing one or more CCDs or CMOS imaging ICs and storing multiple captured frames (a captured video sequence) on a recording medium (e.g., Flash memory, disk or tape), etc.

Figure 2:
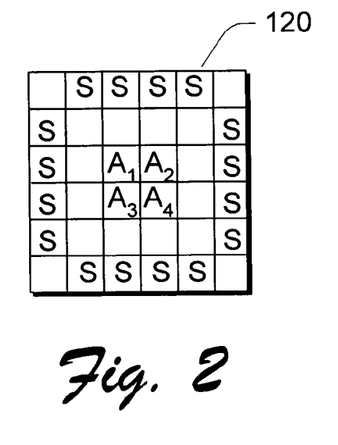
FIG. 2 is an exemplary portion of a digitized image from a picture such as a picture taken in the environment of FIG. 1.

FIG. 2 is an exemplary portion 120 of a digitized image from a picture such as a picture taken in the environment of FIG. 1. In the illustrated example, the 36 pixels of image portion 120 are 24-bit color pixels that are represented using the conventional RGB (Red, Green, Blue) color model, in which three different dots (one red, one green, and one blue) are energized in, for example, the display 110 of FIG. 1 to different intensities to create the appropriate color for the pixel. The 24 bits of color information identify the intensity that each of the three different dots is to be energized to in order to display the pixel. The RGB color model is well known to those skilled in the art and thus will not be discussed further except as it pertains to the discussion herein.

Figure 3A:
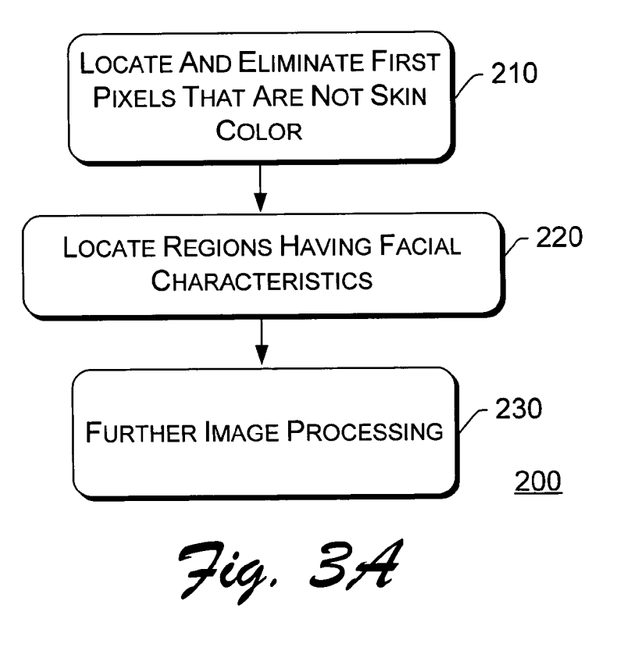
FIG. 3A is an exemplary flowchart of a pre-process for image processing.

FIG. 3A is an exemplary flowchart of a pre-process 200 for image processing. The pre-process 200 optionally begins in block 210 by locating and eliminating from further processing those pixels that do not conform to a skin color model. An exemplary skin color model is described below with reference to block 315 of FIG. 3B.

Figure 3B:
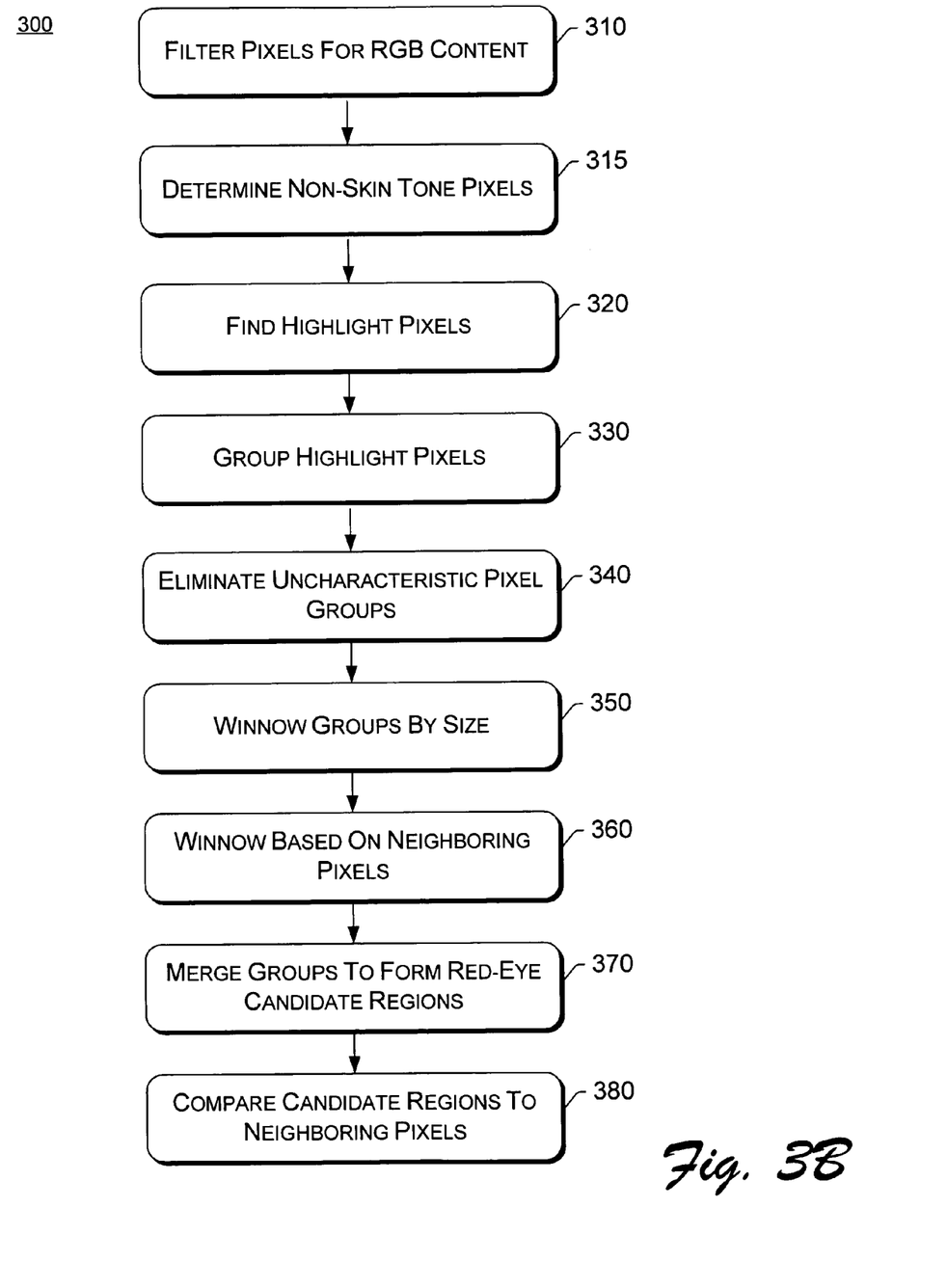
FIG. 3B is an exemplary flowchart of a process for image processing.

In one embodiment, the pre-process 200 identifies regions within an image having characteristics corresponding to a face in block 220. One example of computerized face recognition is described in U.S. Patent Application Publication No. 20020106114 A1, entitled "System and method for face recognition using synthesized training images" and published on Aug. 8, 2002, listing Jie Yan and Hong-Jiang Zhang as inventors, which is assigned to the assignee of the present disclosure and which is hereby incorporated herein by reference. Further image processing then may proceed as noted in block 230 (e.g., the process 300 of FIG. 3B as described below), but within regions identified as having facial characteristics rather than treating the entire image. Employing one or more of the procedures described with reference to blocks 210 and 220, can result in improved accuracy of red-eye identification and amelioration. In some circumstances, one or more of these procedures may result in greater efficiency of image processing FIG. 3B is an exemplary flowchart of a process 300 for image processing. The process 300 begins in block 310.

In block 310, the process 300 filters pixels using a heuristic algorithm to detect a group of candidate regions composed of pixels described by RGB (red-green-blue) content. In one embodiment, the algorithm first determines which pixels include red above a first threshold and also determines which pixels do not correspond to a skin color model. These determinations are used in subsequent acts and thus relatively loose constraints avoid missing red-eye regions. In one embodiment, the algorithm corresponds to identifying red pixels as those pixels for which:

$R>50$   Calc. 1

$R/(R+G+B)>0.40$   Calc. 2

$G/(R+G+B)<0.31$   Calc. 3

$B/(R+G+B)<0.36.$   Calc. 4

In block 315, the process 300 determines which pixels have colorations that do not correspond to skin tones. In one embodiment, when the RGB values for a pixel satisfy the conditions expressed by Calcs. 5 or 6 below, the pixel is considered to be a non-skin-tone pixel.

$G/(R+G+B)>0.40$   Calc. 5

$B/(R+G+B)>0.45$   Calc. 6

In block 320, the process 300 locates and marks highlight pixels and uses the highlight pixels to bound red-colored areas identified in the block 310. For illustrative purposes, an exemplary group of pixels is shown in FIG. 2. Assume that at least one of the pixels marked $A_1$-$A_4$ was identified as a red pixel in block 310. The process 300 uses the group of 36 pixels as a template in a red area of the image, and compares color for the pixels denoted $A_1$-$A_4$ to the pixels marked S.

In one embodiment, the process 300 compares these pixels by taking differences between pixel values as shown below:

$$Diff(A_1) = \frac{1}{4} \times [I(A_1) + I(A_2) + I(A_3) + I(A_4)] - \frac{1}{16} \times \sum_{shadow} I(shadow),$$   Calc. 7 where shadow refers to pixels forming a stencil about the pixels $A_1$-$A_4$, e.g., the pixels denoted "S" in FIG. 2.

For example, when $Diff(A_1)>140$, and the number of red pixels in this 6×6 area is greater than 10, then the pixel $A_1$ will be marked as the highlight pixel. Other highlight pixels are identified by similar processes. U.S. Pat. No. 6,009,209 to Acker et al., entitled "Automated Removal Of Red Eye Effect From A Digital Image", which is assigned to the assignee of this disclosure, describes techniques for determination of red pixels, highlight regions and the like and is hereby incorporated by reference.

In block 330, highlight pixels identified in block 320 are grouped into highlight regions, which form a group of candidate regions for red-eye correction. In one embodiment, neighboring highlight pixels identified in block 310 are grouped to form a candidate region, where "neighboring" means adjacent or separated by one or two pixels.

In one embodiment, highlight pixels are grouped using an algorithm whereby, for any given pixel, vertical and horizontal neighbor pixels are considered to be connected to it and will be grouped with it in a candidate highlight region if they meet color criteria, while diagonally neighboring pixels are considered not to be connected to it and are not evaluated for grouping. The highlight region growth algorithm develops the candidate region by evaluating the four "connected" pixels associated with each identified candidate highlight pixel.

In block 340, highlight regions that are not characteristic of red-eye regions are eliminated from the group of candidate regions. In one embodiment, this determination is based on knowledge that each red-eye region tends to include red pixels concentrated in a single area, while red pixels not associated with red-eye regions tend to be more diffusely scattered.

In one embodiment, each highlight region found in block 340 is included in a region like that shown in FIG. 2 but which is larger, i.e., includes more pixels surrounding the highlight region. In one embodiment, each highlight region is treated together with a surrounding area that includes an area of 25 pixels by 25 pixels. When a group of eight or more pixels around the highlight region have coloration similar to that of the highlight region, the group of pixels is tentatively identified as a candidate region that may be part of a red-eye region.

In one embodiment, color similarity is determined by an algorithm as shown below with respect to Calcs. 8-13. Let B be the number of pixels in the highlight region. Then:

$$avePctR = \frac{1}{A} \sum_{i \in region} \frac{R_i}{R_i + G_i + B_i} \quad \text{Calc. 8}$$

$$avePctG = \frac{1}{B} \sum_{i \in gregion} \frac{G_i}{R_i + G_i + B_i} \quad \text{Calc. 9}$$

$$aveR = \frac{1}{B} \sum_{i \in region} R_i \quad \text{Calc. 10}$$

In one embodiment, a pixel p has color similarity to the region when it satisfies the conditions set forth in Calcs. 11-13 below:

$$\left| \frac{R_p}{R_p + G_p + B_p} - avePctR \right| < 3 \quad \text{Calc. 11}$$

$$\left| \frac{G_p}{R_p + G_p + B_p} - avePctG \right| < 3 \quad \text{Calc. 12}$$

$$|R_p - aveR| < 20 \quad \text{Calc. 13}$$

In block 350, the process 300 winnows regions from the group of candidate regions based on size constraints. In one embodiment, regions that are considered to be too small, too dark, too narrow, too hollow or too large to be typical of red-eye regions are eliminated from the group of candidate regions. In one embodiment, regions for which aveR<50 (from Calc. 10, supra) are considered to be too dark and these regions are eliminated from the group of candidate regions.

In one embodiment, regions are characterized by a width w and a height h. In one embodiment, regions for which w<2 and h<2 are considered to be too small and are eliminated from the group of candidate regions. In one embodiment, regions for which w/h>2.5 or for which h/w>2.5 or for which |w−h|>max(12, min(w/h)/10) (where max and min provide the larger or smaller of the arguments, respectively) are considered to be too narrow and are eliminated from the group of candidate regions. In one embodiment, regions for which B/(w*h)<0.5 are considered to be too hollow and are eliminated from the group of candidate regions. In one embodiment, regions for which (w*h)/(W$_{image}$*H$_{image}$)>1/500, where W$_{image}$ and H$_{image}$ correspond to the overall dimensions of the image, are considered to be too large and are eliminated from the group of candidate regions.

In block 360, additional regions are removed from the group of candidate regions based on analysis of color of pixels bordering the regions. In one embodiment, pixels in an area around the group of pixels being analyzed are compared to a skin color model. In one embodiment, the skin tone model is that described above with reference to block 315 and Calcs. 5 and 6.

When a threshold number or more of the surrounding pixels do not correspond to skin-toned pixels (as determined in block 315), the region is not considered to be likely to be a red-eye region and is eliminated from the group of candidate regions. In one embodiment, the region is inflated by max(w,h)/4 pixels and the pixels in the inflated region around the candidate region are analyzed. When the number of pixels that do not correspond to skin tones is greater than (w*h)/4, the region is eliminated from the group of candidate regions. These processes tend to sharply reduce the number of candidate regions.

In block 370, the process 300 merges remaining highlighted candidate regions to form red-eye regions. Each remaining candidate region is extended, one pixel at a time, to form precise red-eye regions. In one embodiment, the region is expanded to include neighboring red pixels which satisfy Calcs. 1-5 and for which r>aveR/2, where aveR is defined as in Calc. 10, and r is the red value of a neighboring pixel.

In block 380, the red-eye candidate regions from block 370 are again compared to surrounding pixels to determine whether they are surrounded by non-skin-colored pixels or skin-colored pixels. When the red-eye candidate region is determined to be surrounded by non-skin colored pixels, that red-eye candidate region is eliminated from further consideration. In one embodiment, the comparison is carried out as described above with reference to block 315 and Calcs. 5 and 6.

As a result of the processes described with reference to FIGS. 3A and 3B, red-eye regions may be automatically detected in digital images. The process 300 then ends.

The processes described with reference to FIGS. 3A and 3B may be carried out by treating an entire image as described with reference to FIG. 3B. However, other implementations may be employed. The processes 200 as described with reference to blocks 210 and/or 220 may precede the process 300 or may not precede the process 300. In some situations, such as those where images having many similar characteristics are processed, a particular combination of these processes or acts may be advantageously employed. In one embodiment, a user may program a device, such as a computer 502 (described below with reference to FIG. 5) or a camera 102 (FIG. 1) to employ a particular sequence of these acts.

Figure 4:
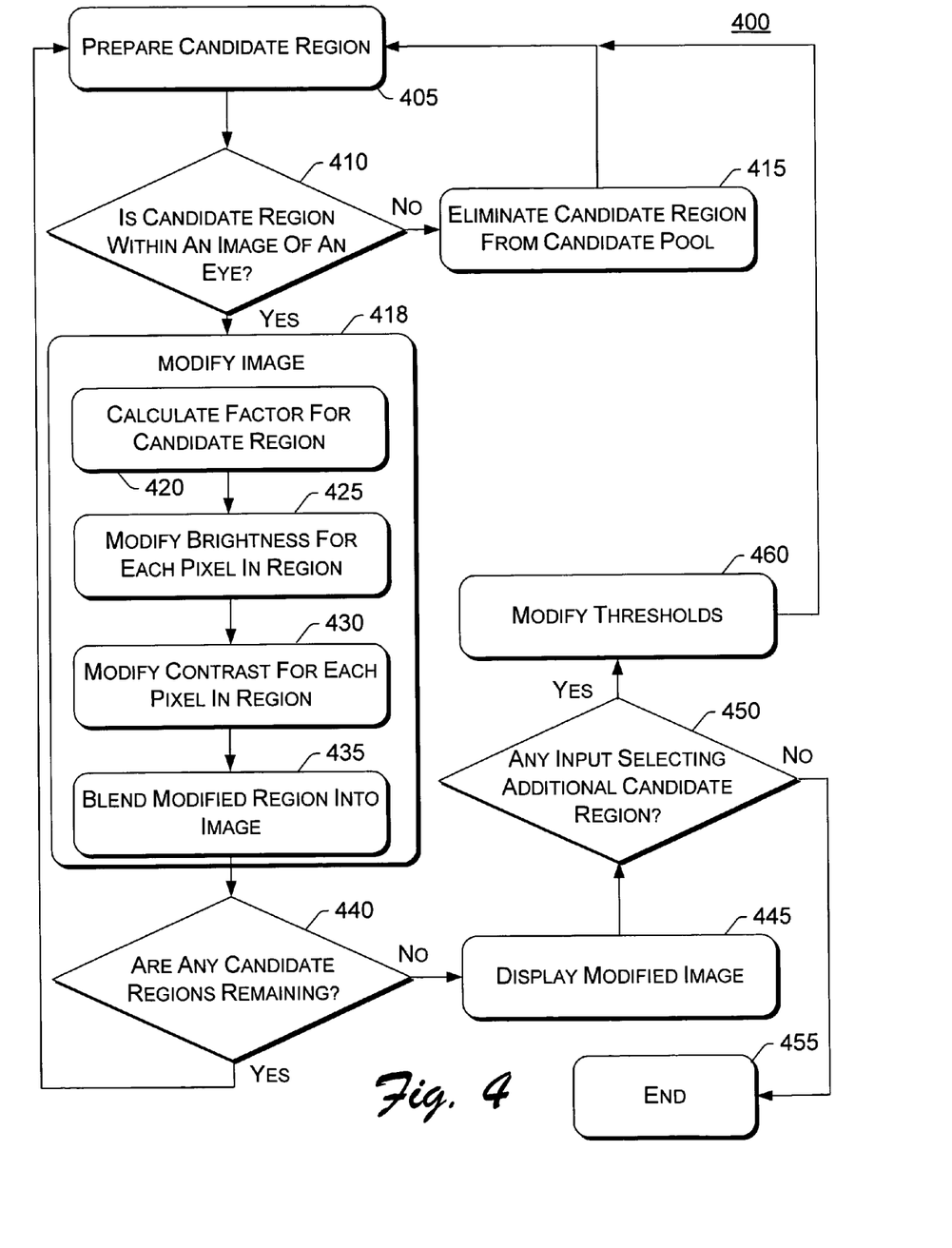
FIG. 4 is an exemplary flowchart of a process 400 for red-eye confirmation and treatment/modification or correction to provide a more natural appearance to a digital image.

FIG. 4 is an exemplary flowchart of a process 400 for red-eye confirmation and treatment/modification or correction to provide a more natural appearance to a digital image. The process 400 basically seeks to reduce the red coloration within the red-eye region and to increase the blue and green coloration to maintain the highlight point within the image of the eye. The process 400 begins in block 405.

In block 405, a candidate region is prepared. Preparing a candidate region may include selection from the pool of candidate regions, such as provided by the process 300, or by user input, as is explained below in more detail with reference to blocks 445-460. In one embodiment, the selected candidate region is magnified in block 405 by one or more factors to provide one or more magnifications of the selected candidate region for the classification process. In one embodiment, the selected candidate region is magnified in block 405 by 3, 4, 5, 6 and 7 times, to provide five separate versions of the candidate region for the classification process. Control then passes to a query task 410.

In the query task 410, candidate regions or a series of different magnifications are confirmed as being within an eye. When the query task 410 determines that any one of the candidates or different magnifications yields an identification of a candidate region as being in an eye, the candidate region is classified as being a red-eye region.

When the query task 410 determines that a candidate region or magnification is not within an image of an eye, that candidate or magnification is eliminated from consideration in block 415. Unless no further candidate regions remain, in which case the process 400 ends, control then passes back to query task 405 and the process 400 selects a different one of the candidates or magnifications.

In one embodiment, candidate red-eye regions are confirmed as being within an image of an eye using a classifier based on conventional AdaBoost classifier techniques, as described in "Robust Real-time Object Detection", P. Viola and M. Jones, Cambridge Research Laboratory Technical Report Series, February 2001, together with an AdaBoost training technique, as described, for example, in U.S. patent application No. 20020102024 A1, published on Aug. 1, 2002, and in "Robust Real-Time Object Detection", P. Viola and M. Jones, Cambridge Research Laboratories, Cambridge, Mass., CRL 2001/01, available at http://crl.research-.compaq.com, which are hereby incorporated by reference herein for their teachings. These techniques rely on training of the eye recognition algorithm.

Block 418 includes acts directed to modification of red-eye regions to provide an image with a more natural appearance. In block 420, a factor F is calculated for the entire red-eye region. In one embodiment, the factor F is calculated using:

$$F=(int)((fPctR-\max(fPctG, fPctB))/255*100*3.2), \quad \text{Calc. 14}$$

where 255 is the maximum color value in RGB color space and division by 255 casts the range to [0, 1], and multiplication by 100 casts the range to [0, 100], multiplication by 3.2 amplifies the difference, where int represents an integer function, and fPctR, fPctG, fPctB are the percentage of the red, green, blue colors in the red-eye region, respectively, excluding red pixels. In one embodiment, red pixels are defined to be those that satisfy the condition:

$$\frac{r}{r+g+b} > 0.35. \quad \text{Calc. 15}$$

In block 425, brightness for each color is modified on a pixel-by-pixel basis in the red-eye region. In one embodiment, the brightness is modified, for each color as described below with reference to Calcs. 16-18 to provide modified luminances rr, gg and bb:

$$rr=\text{AdjustBrightness}(r, -\text{factor}) \quad \text{Calc. 16}$$

$$gg=\text{AdjustBrightness}(g, \text{factor}/3) \quad \text{Calc. 17}$$

$$bb=\text{AdjustBrightness}(b, \text{factor}/3), \quad \text{Calc. 18}$$

where AdjustBrightness is a function defined as:

AdjustBrightness(BYTE c, int factor)=(BYTE) (0.4*factor/100*255+c)

where c is the input color value in RGB space.

In block 430, contrast for each color is modified on a pixel-by-pixel basis in the red-eye region. In one embodiment, the contrast is modified as described below with reference to Calcs. 19-21:

$$rr=\text{AdjustContrast}(rr, -10, \text{iMeanLight}) \quad \text{Calc. 19}$$

$$gg=\text{Adjustcontrast}(gg, -10, \text{iMeanLight}) \quad \text{Calc. 20}$$

$$bb=\text{Adjustcontrast}(bb, -10, \text{iMeanLight}), \quad \text{Calc. 21}$$

where AdjustContrast is a function defined as:

AdjustContrast(BYTE c, int factor, BYTE iMeanLight)=(BYTE)(c+(float)(c-iMeanLight)*factor/100.0), and where c is the input color value in RGB space. In Calcs. 19-21, iMeanLight represents the average luminance of the red-eye region. The process described with respect to blocks 425 and 430 decreases the red value and increases the values of green and blue, while the contrast in the red-eye region is decreased slightly.

In block 435, the modified image is blended with the original image linearly based on the distance from the pixel to the edge. This is done in order to avoid any sharp edge at the border of a rectangle bounding the red-eye region.

In one embodiment, the operations of blocks 425 and 430 to adjust brightness and contrast are carried out over a rectangle that is slightly inflated with respect to the red-eye region. For pixels located outside of the red-eye region, reduced adjustment is applied; the larger the distance to the edge of the region, the less adjustment is applied to the pixel. For pixels located inside the red-eye region, increased adjustment is applied. The larger the distance to the edge, the more adjustment applied to the pixel. This is intended to "mask" appearance of edges of the rectangle in the blended image following correction of red-eye effects.

In one embodiment, coefficient tables corresponding to different rectangle sizes are used to blend the rectangle edges. Given a rectangle size, one coefficient table afn is selected to do the blending operation as follows.

```
If min(w, h) < 8
    af1 is selected;
else if min(w,h) < 16
    af2 is selected;
else if min(w, h) < 22
    af3 is selected;
else
    af4 is selected.
```

Exemplary coefficient tables are shown below.
int af1[8]={0, 2, 20, 80, 175, 235, 253, 255};
int af2[12]={0, 2, 9, 26, 56, 99, 156, 199, 229, 246, 253, 255};
int af3[16]={0, 2, 7, 17, 32, 53, 80, 111, 144, 175, 202, 223, 238, 248, 253, 255};
int af4[22]={0, 1, 3, 7, 13, 22, 34, 50, 70, 92, 115, 140, 163, 185, 205, 221, 233, 242, 248, 252, 254, 255};

In each coefficient table af1-af5, the middle coefficient corresponds to the pixels on the rectangle edges. The coefficients to the left of the middle coefficient correspond to the pixels outside the rectangle and the coefficients to the right of the middle coefficient correspond to pixels within the rectangle.

The smaller the coefficient, the less adjustment is applied to the pixel. The coefficient tables may be calculated from formulas, however, tables may be employed for simplicity and efficiency.

More precisely, pixels are modified as follows:

$$V_{blended}=(1-\alpha)*V_{original}+\alpha*V_{modified}$$

where V represents a pixel's color value in RGB space, and $\alpha$ is the coefficient corresponding to the pixel's location.

Following blending the modified region into the image in block 435, a query task 440 determines when any red-eye candidate regions remain. When the query task 440 determines that there are further red-eye candidate regions remaining, control passes back to block 405 to select and prepare another candidate region. When the query task 440 determines that no further red-eye candidate regions remain, the automatic red-eye detection and correction process ends and control passes to block 445.

In block 445, an image corresponding to the original image with at least one red-eye region modified is displayed for a user to review. The user may note that some regions have been modified inappropriately, that is, regions that were not red-eye regions have been modified, or the user may note that some remaining regions have red-eye characteristics.

In one embodiment, following automatic red-eye region detection and confirmation, a manual process may be employed to detect any remaining red-eye regions. This may be desirable because an automated system may have a very high degree of efficiency in identifying and correcting red-eye regions but still fail to detect and correct a small but unacceptable percentage of such regions.

In one embodiment, a user of a camera, printer, computer or transmission system displays an image. A tactile or other user input device is employed to designate a portion of the image. In one embodiment, a sub-rectangle having height and width of one-eighth of a total image size is defined about the designated portion. The processes described with reference to process 300 then are executed with reference to the image portion within the sub-rectangle. In one embodiment, a threshold for determining when a red-eye candidate is within an image of an eye is reduced, with the result that the candidate (e.g., from block 370) having a highest overall confidence score will be identified as a red-eye region and automatically corrected. The adjustment of the threshold is dependent on the classifier and the algorithm. It is determined empirically.

A query task 450 determines when the user selects a region for further processing and determines what type of further processing is desired.

When the query task 450 determines that the user will select a region for further processing, the user may designate a portion of the image by positioning a cursor in the vicinity of that region. When the user indicates that a region that should not have been treated as a red-eye region has in fact been so treated, the process 400 can restore that image portion so that it appears as it did prior to initiation of the process 400.

When the query task 450 determines that the user indicates that a region continues to display red-eye characteristics, thresholds may be modified or reduced in block 460, i.e., in some or all of Calcs. 1-7 and 11-13, and that region treated as described above with respect to blocks 405-445, but with the modified thresholds.

When the query task 450 determines that no further regions are being selected by the user, the process 400 ends (block 455).

The processes of FIGS. 3A, 3B and 4 may be implemented as one or more modules, such as hardware modules, or software modules. Such can comprise ASICs or processors coupled with one or more software modules.

Figure 5:
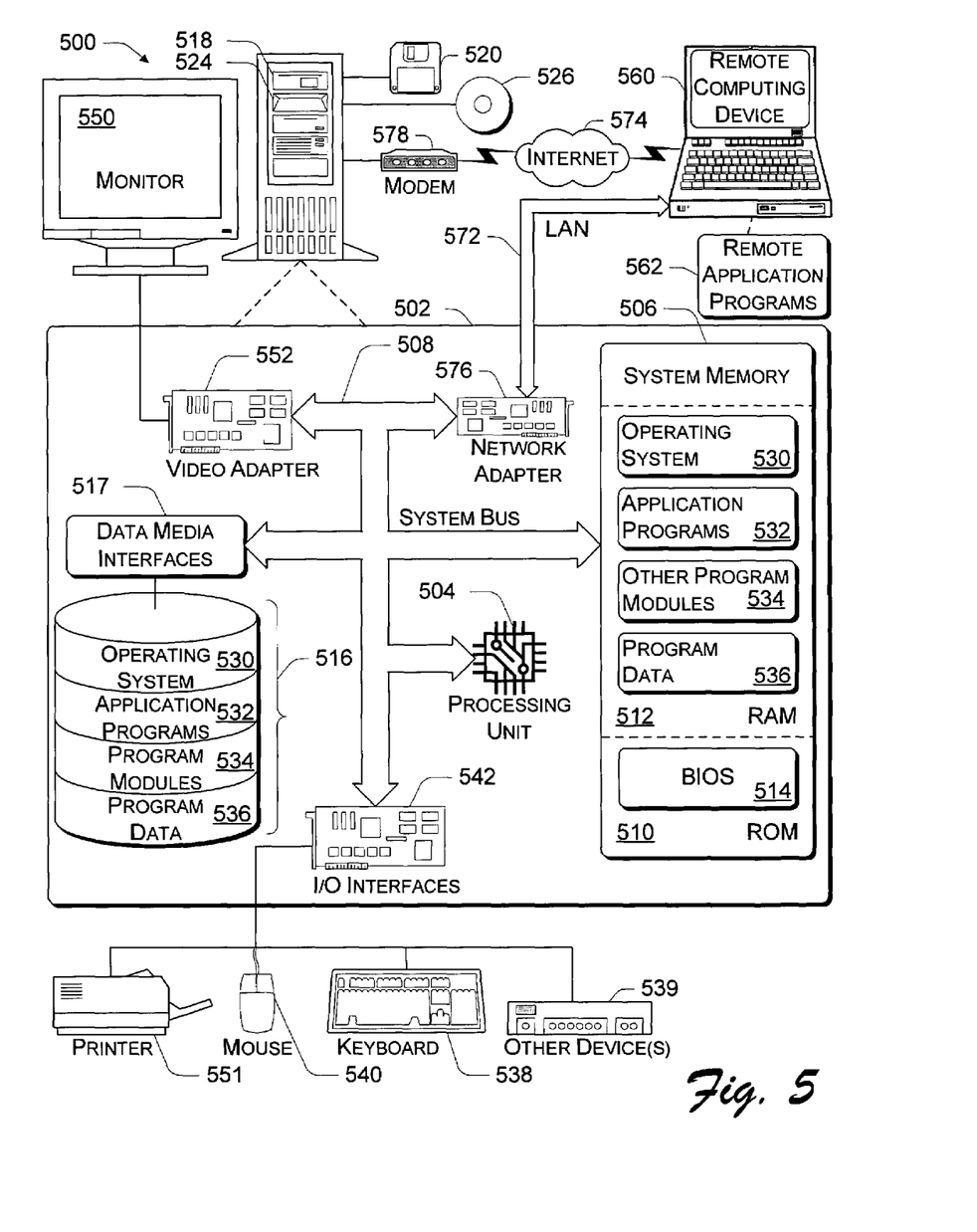
FIG. 5 illustrates an example of a general computer environment.

FIG. 5 illustrates an example of a general computer environment 500. The illustrated operating environment is only one example of a suitable operating environment and is not intended to suggest any limitation as to the scope of use or functionality of the embodiments of this disclosure. Other well-known computing systems, environments, and/or configurations that may be suitable for implementation of the disclosure include, but are not limited to, personal computers, server computers, hand-held or laptop devices, multi-processor systems, microprocessor-based systems, programmable consumer electronics (e.g., digital video recorders), gaming consoles, cellular telephones, image capture devices (e.g., digital cameras), printers including data processing capabilities, network PCs, minicomputers, mainframe computers, distributed computing environments that include any of the above systems or devices, and the like.

FIG. 5 shows a general example of a computer 502 that can be used to implement the processes described herein. Computer 502 is shown as an example of a computer in which various embodiments of these processes can be practiced, and can be, for example, the device 108 of FIG. 1, or a computer that is a portion of Is the camera 102. Computer 502 is illustrated as only an example of a computing device that may be used with the invention; other devices may alternatively used that include more components or alternatively fewer components than those illustrated in FIG. 5. For example, a digital camera may include only a processing unit, bus, system memory, universal serial bus interface, and removable storage device.

Computer 502 includes one or more processors or processing units 504, a system memory 506, and a bus 508 that couples various system components including the system memory 506 to processor(s) 504. The bus 508 represents one or more of any of several types of bus structures, including a memory bus or memory controller, a peripheral bus, an accelerated graphics port and a processor or local bus using any of a variety of bus architectures. The system memory 506 includes nonvolatile read only memory (ROM) 510 and random access memory (RAM) 512, which may or may not be a volatile memory. A basic input/output system (BIOS) 514, containing the basic routines that help to transfer information between elements within computer 502, such as during start-up, is stored in ROM 510.

Computer 502 further includes a hard disk drive 516 for reading from and writing to a hard disk, not shown, coupled to bus 508 via a data media interface 517 (e.g., a SCSI, ATA, or other type of interface); a magnetic disk drive 518 for reading from and writing to a removable magnetic disk 520 and an optical disk drive 524 for reading from and/or writing to a removable optical disk 526 such as a CD ROM, DVD, or other optical media. The hard disk drive 516, magnetic disk drive 518, and optical disk drive 522 are each coupled to the system bus 508 by one or more data media interfaces 517. Alternatively, the hard disk drive 516, magnetic disk drive 518, and optical disk drive 524 can be coupled to the system bus 508 by one or more interfaces (not shown).

The drives and their associated computer-readable media provide nonvolatile storage of computer readable instructions, data structures, program modules and other data for computer 502.

Although the exemplary environment is described herein as employing a hard disk drive 516, a removable magnetic disk 520 and a removable optical disk 526, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk drive 516, magnetic disk 520, optical disk 526, ROM 510, or RAM 512, including an operating system 530, one or more application programs 532, other program modules 534, and program data 536. A user may enter commands and information into computer 502 through input devices such as keyboard 538 and pointing device 540. Other input devices 539 may include a microphone, joystick, game pad, satellite dish, scanner, or the like. These and other input devices are coupled to the processing unit 504 through an input/output interface 542 that is coupled to the system bus (e.g., a serial port interface, a parallel port interface, a universal serial bus (USB) interface, an IEEE 1394 (Firewire) interface, etc.). A monitor 550 or other type of display device is also coupled to the system bus 508 via an interface, such as a video adapter 552. In addition to the monitor 550, personal computers such as the computer 502 typically include other peripheral output devices such as printer 551 and speakers (not shown).

Computer 502 operates in a networked environment using logical connections to one or more remote computers, such as a remote computer 560. The remote computer 560 may be another personal computer, a server, a router, a network PC, a peer device or other common network node, and typically includes many or all of the elements described above relative to computer 502. The logical connections represented in FIG. 5 include a local area network (LAN) 572 and a wide area network (WAN) 574.

In a networked environment, such as that illustrated with computing environment 500, program modules depicted relative to the computer 502, or portions thereof, may be stored in a remote memory storage device. By way of example, remote application programs 562 reside on a memory device of remote computer 560.

Such networking environments are commonplace in offices and enterprise-wide computer networks, and in association with intranets and the Internet. In certain embodiments, computer 502 executes an Internet Web browser program (which may optionally be integrated into the operating system 530) such as the "Internet Explorer" Web browser manufactured and distributed by Microsoft Corporation of Redmond, Wash.

When used in a LAN networking environment, computer 502 is coupled to the local network 572 through a network interface or adapter 576. When used in a WAN networking environment, computer 502 typically includes a modem 578 or other means for establishing communications over the wide area network 574, such as the Internet. The modem 578, which may be internal or external, is coupled to the system bus 508 via a serial port interface. In a networked environment, program modules depicted relative to the personal computer 502, or portions thereof, may be stored in the remote memory storage device. It will be appreciated that the network connections shown are exemplary and other means of establishing a communications link between the computers may be used.

Computer 502 typically includes at least some form of computer readable media. Computer readable media can be any available media that can be accessed by computer 502. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 502. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The present disclosure is provided in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) 504 of the computer 502.

Alternatively, the concepts disclosed herein may be implemented in hardware or a combination of hardware, software, and/or firmware. For example, one or more application specific integrated circuits (ASICs) could be designed or programmed to embody the concepts disclosed herein.

CONCLUSION

Although the description above uses language that is specific to structural features and/or methodological acts, it is to be understood that the recitation of the appended claims is not limited to the specific features or acts described. Rather, the specific features and acts are disclosed as exemplary forms of implementing these concepts.

The invention claimed is:

1. A process at least partially implemented by a computer for automatic red-eye artifact modification in a digital representation of an image comprising:
   detecting, by a processor, regions corresponding to facial images within the digital representation; and
   locating, by a processor, red-eye regions within the detected regions, the locating comprising:
      denoting red pixels as satisfying R>50; R/(R+G+B)>0.40; G/(R+G+B)<0.31 and B/(R+G+B)>0.36;
      determining when RGB values for a region about a denoted red pixel satisfy conditions: G/(R+G+B)>0.4(Original) 0 or B/(R+G+B)>0.45;
      when the RGB values for the region satisfy the conditions, removing the region from a pool of red-eye candidate regions; and
      when the RGB values for the region do not satisfy the conditions, maintaining the regions in the pool.

2. A process at least partially implemented by a computer for automatic red-eye artifact modification in a digital representation of an image comprising:
   detecting, by a processor, regions corresponding to facial images within the digital representation;

locating, by the processor, red-eye regions within the detected regions, the locating comprising:
  filtering pixels comprising the digital representation for RGB content to denote red pixels and to denote non-skin-tone pixels;
  finding highlight pixels within the denoted red pixels;
  grouping highlight pixels to form a pool of highlight areas;
  eliminating groups not characteristic of red-eye regions from the pool;
  winnowing groups by size to remove some groups from the pool;
  winnowing groups based on comparison of colors of nearby pixels to remove additional groups from the pool;
  merging groups to form red-eye candidate regions; and
  second winnowing groups based on comparison of colors of nearby pixels to remove further groups from the pool; and
automatically modifying, by the processor the located red-eye regions to
provide a modified image.

3. The process of claim 2, further comprising, prior to detecting, removing from a pool of candidate pixels comprising the digital representation first pixels having colors indicative that the first regions do not represent facial images.

4. The process of claim 2, further comprising,
after automatically modifying:
displaying the modified image;
receiving an indication from a user of a region within the modified image for further analysis;
identifying a candidate red-eye region within the modified image; and
correcting the identified red-eye region in response to user input.

5. A system for image manipulation comprising:
a processor;
a memory coupled to the processor and configured to store data representing an image; and
an artifact modification module configured to cause the processor to access the data representing the image and to:
  identify first pixels having a red content above a first threshold;
  identify second pixels having coloration inconsistent with a skin color model by comparing pixel to a set of threshold values;
  sort the first and second pixels to form a pool of red-eye candidate regions;
  winnow the pool to eliminate red-eye candidate regions that (i) are not associated with nearby second pixels and (ii) are not associated with images corresponding to an image of an eye to provide red-eye regions; and
  modify and blend the red-eye regions to provide a modified image; and
wherein the artifact modification module configured to modify and blend the red-eye regions is configured to:
  decrease the red value within the red-eye region;
  increase the values of green and blue within the red-eye region;
  decrease contrast within the red-eye region to provide a modified red-eye region; and
  blend the modified red-eye region with the original image linearly based on the distance from each pixel in the red-eye region to a nearest edge of the red-eye region.

6. The system of claim 5, wherein the artifact modification module is further configured to:
  cause the modified image to be displayed;
  accept user input designating at least a portion of the modified image;
  identify first and second pixels using a modified first threshold and a modified set of threshold values to identify one or more additional red-eye candidate regions; and
  remove and blend the one or more additional red-eye regions to provide an altered image.

7. The system of claim 5, wherein the processor is contained in an apparatus chosen from a group consisting of a digital camera, a digital image scanning device, a computer and a printer.

8. The system of claim 5, wherein the artifact modification module comprises computer code embodied in a storage medium.

9. The system of claim 5, wherein the artifact modification module comprises integrated circuitry.

10. The system of claim 5, wherein the artifact modification module is further configured to:
  determine those regions within the data representing the image having characteristics associated with a face; and
  identify first and second pixels only within those regions.

11. The system of claim 5, wherein the artifact modification module is further configured to:
  filter pixels according to a skin tone color model to identify candidate pixels;
  determine, among the candidate pixels, those regions within the data representing the image having characteristics associated with a face; and
  identify first and second pixels only within those regions.

12. A process at least partially implemented by a computer for detection and modification of specific types of regions in a digital representation of an image comprising:
  identifying first pixels in a first set of regions including red values above a first threshold;
  identifying second pixels adjacent the first pixels having coloration inconsistent with a color model for human skin;
  identifying a third set of regions taken from the second set that are bordered by regions having coloration consistent with the color model;
  locating highlight regions within the third set of regions;
  grouping the highlight regions into a pool of red-eye candidate regions;
  determining red-eye regions from the pool which satisfy predetermined criteria; and
  modifying and blending the determined red-eye regions to provide a modified image.

13. The process of claim 12, wherein determining comprises winnowing the third set to only include those regions whose images are consistent with being associated with an image of an eye.

14. The process of claim 12, further comprising:
  displaying the digital representation with the third set demarcated; and
  accepting user input selecting a fourth set having overlap with the third set in response to displaying, wherein the fourth set includes fewer regions than the third set.

15. The process of claim 12, further comprising:
  displaying the digital representation with the third set demarcated; and accepting user input selecting a fourth set having overlap with the third set in response to displaying, wherein the fourth set includes more regions than the third set.

16. The process of claim 12, further comprising:

displaying the digital representation with the third set demarcated; and accepting user input selecting a fourth set having overlap with the third set in response to displaying; and correcting for red-eye distortion in the fourth set.

17. A tangible computer readable medium having a plurality of instructions thereon that, when executed by a processor, cause the processor to:

automatically process a digital image to identify red-eye regions within the digital image, and wherein the plurality of instructions to cause the processor to process the image further comprise instruction to cause the processor to:

(a) identify first pixels in a first set of regions including red values above a first threshold;

(b) identify second pixels adjacent the first pixels having coloration inconsistent with a color model for human skin;

(c) identify a third set of regions taken from the second set that are bordered by regions having coloration consistent with the color model;

(d) locate highlight regions within the third set of regions;

(e) group the highlight regions into a pool of red-eye candidate regions;

(f) determine red-eye regions from the pool which satisfy predetermined criteria; and (g) modify the red-eye regions and blend the modified red-eye regions to provide a modified image; and modify the red-eye regions to provide a more natural appearance to the image.

* * * * *